United States Patent
Nabi et al.

(10) Patent No.: US 11,808,472 B2
(45) Date of Patent: Nov. 7, 2023

(54) CONTROLLING THERMAL STATE OF CONDITIONED ENVIRONMENT BASED ON MULTIVARIABLE OPTIMIZATION

(71) Applicant: Mitsubishi Electric Research Laboratories, Inc., Cambridge, MA (US)

(72) Inventors: Saleh Nabi, Arlington, MA (US); Ankush Chakrabarty, Bedford, MA (US); Mouhacine Benosman, Boston, MA (US); Sanjana VijayShankar, Boston, MA (US)

(73) Assignee: Mitsubishi Electric Research Laboratories Inc., Cambridge, MA (US)

( * ) Notice: Subject to any disclaimer, the term of this patent is extended or adjusted under 35 U.S.C. 154(b) by 88 days.

(21) Appl. No.: 17/213,277

(22) Filed: Mar. 26, 2021

(65) Prior Publication Data
US 2022/0316736 A1 Oct. 6, 2022

(51) Int. Cl.
*F24F 11/63* (2018.01)
*G05D 23/19* (2006.01)
(Continued)

(52) U.S. Cl.
CPC .............. *F24F 11/63* (2018.01); *F24F 11/46* (2018.01); *G05D 23/1917* (2013.01);
(Continued)

(58) Field of Classification Search
CPC ...... F24F 11/63; F24F 11/46; G05D 23/1917; G06F 17/13; G06F 30/17; G06F 30/20;
(Continued)

(56) References Cited

U.S. PATENT DOCUMENTS

2015/0095000 A1* 4/2015 Patil ........................ G06F 30/13
703/2

FOREIGN PATENT DOCUMENTS

CN 108491564 * 9/2018 ........... G05B 13/048

OTHER PUBLICATIONS

Benosman et al. "Robust Nonlinear State Estimation for Thermal-Fluid Models Using Reduced-Order Models: The Case of the Boussinesq Equations" 2019 IEEE 58th Conference on Decision and Control (CDC); Nice, France, Dec. 11-1 [retrieved on Jul. 26, 2022] (Year: 2019).*

(Continued)

*Primary Examiner* — Rehana Perveen
*Assistant Examiner* — Alfred H B Wechselberger
(74) *Attorney, Agent, or Firm* — Gennadiy Vinokur; Hironori Tsukamoto

(57) ABSTRACT

A system a method for controlling an operation of HVAC system is provided. The system comprises at least one processor; and memory having instructions stored thereon that, when executed by the at least one processor, cause the system to receive data indicative of the operation of the HVAC system and optimize a cost function to reduce a difference between a full thermal state of the conditioned environment simulated from the received data based on a physical model of airflow including a partial differential equation (PDE) and a thermal state of the conditioned environment reconstructed by an observer using a reduced order model (ROM) of airflow including an ordinary differential equation (ODE) from values of the full thermal state at a set of locations, wherein optimization of the cost function is a multivariable optimization of a structure of the observer and a structure of the ODE.

8 Claims, 11 Drawing Sheets

(51) Int. Cl.
    G06F 17/13    (2006.01)
    G06F 30/20    (2020.01)
    G06F 30/28    (2020.01)
    G06F 30/17    (2020.01)
    F24F 11/46    (2018.01)
(52) U.S. Cl.
    CPC .............. *G06F 17/13* (2013.01); *G06F 30/17* (2020.01); *G06F 30/20* (2020.01); *G06F 30/28* (2020.01)
(58) Field of Classification Search
    CPC .. G06F 30/12; G06F 2111/00–2119/22; G06F 30/25; G06F 30/27; G06F 30/28; G06F 30/13; G06F 30/18; G06F 2113/08; Y02B 30/70
    See application file for complete search history.

(56) References Cited

OTHER PUBLICATIONS

Wang et al. "A sequential LMI approach to design a BMI-based multi-objective nonlinear observer" European Journal of Control 44 (2018), pp. 50-57 [retrieved on Aug. 3, 2022] (Year: 2018).*
Kramer, B. "Model and Data Reduction for Control, Identification and Compressed Sensing" [Thesis] Virginia Polytechnic Institute and State University [retrieved on Aug. 4, 2022] (Year: 2015).*
Benosman et al. "Robust nonlinear state estimation for a class of infinite-dimensional systems using reduced-order models" International Journal of Control; https://doi.org/10.1080/00207179.2019.1645359 [retrieved on Aug. 4, 2022] (Year: 2019).*
Borggaard et al. "Control, Estimation and Optimization of Energy Efficient Buildings" 2009 American Control Conference; Hyatt Regency Riverfront, St. Louis, MO, USA; Jun. 10-12, 2009 [retrieved on Aug. 3, 2022] (Year: 2009).*
Avis et al. "Graph Theory and Combinatorial Optimization" [Editor] Chapter 5, Springer [retrieved on Jul. 26, 2022] (Year: 2005).*
Burns et al. "A Computational Approach to Sensor/Actuator Location for Feedback Control of Fluid Flow Systems" Proc. SPIE 2494, Sensing, Actuation, and Control in Aeropropulsion, (May 30, 1995); doi: 10.1117/12.210519 [retrieved on Aug. 4, 2022] (Year: 1995).*
Hu et al. "Sensor Location in a Controlled Thermal Fluid" 2016 IEEE 55th Conference on Decision and Control (CDC) Aria Resort & Casino; Dec. 12-14, 2016, Las Vegas, USA [retrieved on Aug. 4, 2022] (Year: 2016).*
Fang et al. "Optimal Sensor and Actuator Deployment for HVAC Control System Design" 2014 American Control Conference (ACC) Jun. 4-6, 2014. Portland, Oregon, USA [retrieved on Jun. 21, 2023] (Year: 2014).*
Gahlawat et al. "A Convex Sum-of-Squares Approach to Analysis, State Feedback and Output Feedback Control of Parabolic PDEs" IEEE Transactions on Automatic Control, vol. 62, No. 4, Apr. 2017 [retrieved on Aug. 3, 2022] (Year: 2017).*
Chen et al. "Reverse-Order Multi-Objective Evolution Algorithm for Multi-Objective Observer-Based Fault-Tolerant Control of T-S Fuzzy Systems" IEEE Access 9 (2020): 1556-1574; DOI: 10.1109/ACCESS.2020.3047193 [retrieved on Jun. 21, 2023] (Year: 2020).*
Koga et al. "Learning-Based Robust Observer Design for Coupled Thermal and Fluid Systems" 2019 American Control Conference (ACC), Philadelphia, PA, USA, Jul. 10-12, 2019 [retrieved on Jul. 26, 2022] (Year: 2019).*
Leibfritz et al. "Reduced order output feedback control design for PDE systems using proper orthogonal decomposition and nonlinear semidefinite programming" Linear Algebra and its Applications, vol. 415 (2006), pp. 542-575 [retrieved on Jun. 21, 2023] (Year: 2006).*
Zahr, M. "Adaptive Model Reduction to Accelerate Optimization Problems Governed by Partial Differential Equations" [Thesis] Stanford University, Computational and Mathematical Engineering [retrieved on Jun. 21, 2023 ] (Year: 2016).*
Deliparaschos et al. "A model-based embedded control hardware/software co-design approach for optimized sensor selection of industrial systems" 2015 23rd Mediterranean Conference on Control and Automation (MED), Jun. 16-19, 2015. Torremolinos, Spain [retrieved on Jun. 21, 2023] (Year: 2015).*

* cited by examiner

CONTROLLING THERMAL STATE OF CONDITIONED ENVIRONMENT BASED ON MULTIVARIABLE OPTIMIZATION

TECHNICAL FIELD

The present disclosure relates generally to heating, ventilating, and air-conditioning (HVAC) system and more particularly to controlling an operation of heating, ventilating, and air-conditioning (HVAC) system arranged to condition an environment.

BACKGROUND

Air-conditioning systems, such as heating, ventilating and air conditioning (HVAC) system, are widely used in industrial and residential applications to condition an environment. Introduction of variable speed compressors, variable position valves, and variable speed fans for a vapor compression cycle has greatly improved flexibility of operation of the HVAC systems. Efficiency of the HVAC systems can be improved by controlling the variable components of the HVAC systems. In other words, control inputs can be provided to the HVAC systems to improve the efficiency. For example, a speed of the compressor can be adjusted to modulate a flow rate of a refrigerant. A speed of an evaporator fan and a condenser fan can be varied to alter heat transfer between air and heat exchangers. A change in an expansion valve opening can influence a pressure drop between a high-pressure and a low-pressure in the HVAC system, which, in turn affects the flow rate of the refrigerant as well as super heat temperature at a corresponding evaporator outlet.

A combination of the control inputs to the HVAC system that delivers a particular amount of heat is often not unique and the various combinations of the control inputs consume different amounts of energy. Therefore, it is desirable to operate the HVAC system using a combination of the control inputs that minimizes the energy and maximizes the energy efficiency of the HVAC system. Some approaches maximizing the energy efficiency rely on use of mathematical models of physics of the HVAC systems. Such model-based approaches attempt to describe influence of the control inputs of the HVAC system on thermodynamic behavior and energy consumption of the HVAC system. In such model-based approaches, prior analytical models are used to predict a combination of the control inputs that meets heat load requirements and minimizes the energy.

However, the use of the mathematical models for such prediction of the combination of the control inputs includes shortcomings. For example, the mathematical models depend on simplifying assumptions in order to produce a mathematically tractable representation. Such assumptions ignore important effects or do not consider installation-specific characteristics such as room size, causing the mathematical models to deviate from actual behavior of the HVAC system. In some approaches, knowledge of airflow produced during an operation of the HVAC system is used to optimize the operation of the HVAC system by formulating a physical model of the airflow. However, the physical model of the airflow is of infinite dimension and highly complex to be used in real time control applications. In addition, the physical model of the airflow may change during the operation of the air-conditioning system.

The computational cost for prediction and control of Boussinesq equations (comprising of Navier-Stokes equations along with conservation of energy), which serves as the physical model of airflow, is intractable for the real time control applications. Hence, it is desirable to reconstruct humidity, temperature and velocity of the airflow in the environment from sensory data in a fast manner. Various observer design techniques, such as Kalman filter, H-∞ filter, etc., can be employed to achieve such a task. Such observer design techniques are based on reducing an estimation error in a statistical sense for a given norm of measuring the estimation error. The estimation error can be defined as a norm of difference between reconstructed quantities and ground truth (e.g., the solution of CFD). Once the observer is designed, quantities of interest (e.g., air humidity, temperature and velocity) in all or a part of the environment (e.g., the occupant region) can be reconstructed and then be used for control (e.g., a closed-loop control) to achieve a desired state (e.g., thermal comfort of occupants or minimal energy consumption of the HVAC system).

However, the reconstruction/estimation of the quantities of interest and real time control of the airflow is challenging. For instance, due to spatiotemporal evolution of the quantities of interest, location of sensors plays a crucial role in the estimation. If the sensor is in a location that is far away from an inlet of the HVAC system, the estimation of the quantities of interest in vicinity of the inlet becomes poor or impossible. Further, there are many instances that several coherent structures form in the environment. If the sensor is placed far away from such structures, e.g., in large vortex of air that develops between the inlet and exhaust of the HVAC system, the reconstruction error becomes large in such a region. Depending on a relative location of the inlet and outlet, a number of inlets and outlets (actuators), heat loss through the walls, configuration of items and occupants in the environment, among other factors, a number and location of the sensors required to accurately and robustly reconstruct the quantities of interest may be different.

Further, there has been extensive research on choosing scientifically sound and experimentally validated models of the airflow in the environment. However, such models are partial differential equations (PDEs) whose analytical solutions often do not exist. Hence, a numerical solution is required. Such numerical solutions (e.g., finite difference, finite volume, finite element) are tedious tasks and require extensive computational cost and hardware resources. This is prohibitive for the real time control applications. To that end, it is desirable to use reduced-order models (ROMs). An advantage of using the ROMs instead of original governing equations is that the ROMs have dimensions smaller than that of discretized algebraic equation arising from the PDEs, which make the ROMs amenable for the real time control applications. However, various ROMs do not inherit original system proprieties, e.g., in terms of stability of the HVAC system.

SUMMARY

It is an object of some embodiments to determine a stable reduced-order model (ROM) that can be used for estimation of airflow dynamics during operation of heating, ventilating and air conditioning (HVAC) system. Further, it is an object of some embodiments to use the determined ROM for real-time controlling of an operation of the HVAC system, such that heat load requirements of the operation are met, and performance of the HVAC system is optimized. Additionally or alternatively, it is an objective of some embodiments to determine locations of the sensors along with the ROM.

The HVAC system may be arranged to condition an environment. The environment may be a room or space of a building, or the whole building where the HVAC system is installed. In some embodiments, the environment may correspond to space of the building where occupants are located or reside. The HVAC system is configured to output air in the environment to condition the environment and ensure thermal comfort of the occupants of the environment. Thermal states of the outputted air include a temperature and a velocity of the air outputted by the HVAC system. In an alternate embodiment, the thermal state of the outputted air includes one or combination of the temperature, the velocity and humidity of the air outputted by the HVAC system.

According to an embodiment, a system for controlling the operation of the HVAC system is provided. The system may include a processor, and a memory configured to store instructions executable by the processor. The processor is configured to execute the instructions stored in the memory to perform steps required to control the operation of the HVAC system. The system may control the HVAC system to optimize energy consumption of the HVAC system by changing the thermal state in the environment. In an embodiment, the system is configured to receive data indicative of the operation of the HVAC system. The data indicative of the operation of the HVAC system may include boundary conditions corresponding to the environment. Additionally, the data indicative of the operation of the HVAC system may include geometry of the environment, a number of inlets and outlets, and the like.

Since the HVAC control changes the thermal state in the environment to optimize the energy consumption, it is desirable to know dynamics of the airflow produced within the environment during the operation of the HVAC system. To that end, a physical model of the airflow is considered. For example, the physical model of the airflow can be defined according to a Boussinesq equation. However, computational cost for prediction and control of Boussinesq equations (comprising of Navier-Stokes equations along with conservation of energy), which serves as the physical model of the airflow, is intractable for real time control (or online control) of the HVAC system. For instance, the Boussinesq equation describing the physical model of the airflow is a partial differential equation (PDE) which is difficult to solve in the real time. Therefore, it is desired to represent the physical model of the airflow including the PDE with a reduced-order model (ROM) represented by an ordinary differential equation (ODE) having a number of parameters less than a number of parameters of the physical model of the airflow.

Some embodiments are based on understanding that many different techniques can perform such a dimensionality reduction. For example, based on the data indicative of the operation of the HVAC system and the Boussinesq equation, the system executes computational fluid dynamic (CFD) simulation to produce an estimation of the thermal state at all points (or locations) of the environment. In other words, the CFD simulation technique can be used to simulate the dynamics of the airflow within the environment. The thermal state at all the points produced by the CFD simulation is referred to as the full thermal state. The full thermal state is contemplated as ground truth values of the thermal state at all the points of the environment. Further, the ROM is derived such that estimation of the airflow dynamics within the environment using the ROM approximates the full thermal state.

For example, the CFD simulation yields the full thermal state at each time instant. The full thermal state at an instant of time is referred to as a snapshot. The different snapshots of the CFD simulation can be organized into a matrix capturing the dynamics of the airflow, and the ROM is determined by solving an optimization problem such that a difference between the dynamics of the airflow estimated by the ROM in a low-dimensional space and the dynamics of the airflow provided by the CFD simulation is minimized. Such an approach can be considered as a linear estimation of the ROM as a matrix A by solving a minimization problem given by min $\|AX_i - X_{i+1}\|$, wherein the matrix A is the ROM, $X_i$ represents the thermal state at time i. The matrix A can be used to estimate the airflow dynamics in the low-dimensional space in a linear manner, e.g. $x_{i+1} = A^* x_i$. The minimization problem can be solved by several matrix decomposition techniques. For example, the matrix A can be determined using Proper Orthogonal Decomposing (POD) with Galerkin Projection, Dynamic Mode Decomposition (DMD), Spectral POD, Balanced POD, and the like. The aforementioned techniques can solve the minimization problem and determine the matrix A, i.e., the ROM.

In some cases, the determined ROM may not be linear. The determined ROM may be a quadratic or a nonlinear ROM. Further, the aforementioned techniques that can solve the minimization problem, alone or in combination, do not guarantee that the determined ROM can be used for the online HVAC control, e.g. the determined ROM may lack stability or observability. As the ROM operates in the low-dimensional space, there is a need for an observer that can use the airflow dynamics captured by the ROM in the low-dimensional space and actual measurements at some points in the environment to produce an estimation/reconstruction of a thermal state at all desired points in the environment. According to an embodiment, the observer is a function of the ROM, i.e., the ODE and/or the matrix A, and placement of sensors in the environment. Specifically, a structure of the observer includes a gain referred to herein as a gain matrix K, and designing the observer means determining the matrix K.

Some embodiments are based on recognition that as the matrix K depends on the matrix A, the matrix A is determined at first, and then the matrix K is determined based on the matrix A. However, some embodiments are based on realization that calculation of the matrix K may influence the determination of the matrix A. In other words, there is interdependency between the determination of the matrix A and the matrix K. Consequently, some embodiments are based on realization that joint and interdependent optimization of the matrix A and the matrix K can improve accuracy and global optimality of the reconstruction of the thermal state. To that end, the system performs a multivariable optimization that includes the joint optimization of a structure of the observer (i.e., the matrix K) and a structure of the ROM (i.e., the matrix A). In other words, the ROM and the observer are determined together as optimization parameters of a cost function using the full thermal state as the ground truth.

Therefore, the system optimizes the cost function to reduce a difference between the full thermal state of the environment simulated based on the received data and the physical model of the airflow including the PDE, and the thermal state of the environment reconstructed by the observer using the ROM from values of the full thermal state at a set of locations. The optimization of the cost function is the multivariable optimization of the structure of the observer and the structure of the ODE or the ROM. According to an embodiment, the set of locations of sensors for measuring the thermal state is predetermined.

Additionally or alternatively, some embodiments are based on recognition that the matrix K is a function of the placement of the sensors in the environment. The sensors may measure one or combination of the temperature, the velocity, and the humidity of the air within the environment. The placement of the sensors can be represented as a binary matrix C with elements corresponding to locations in the environment. The elements of the matrix C have value 1 at the elements corresponding to the locations of the sensors, and values 0 otherwise. In some embodiments, the matrix C, i.e., the locations of the sensors are predetermined by a designer of the HVAC system. However, in some other embodiments, the matrix C may be unknown and/or may be a design parameter. Some embodiments are based on realization that, as the matrix K depends on the matrix A and the matrix C, the matrix C can be incorporated as an optimization parameter in the multi-variable optimization. In other words, the structure of the ODE or the ROM, the structure of the observer, the set of locations of the sensors are jointly optimized as a part of the multivariable optimization, which is referred to as 'co-design'. The co-design approach not only yields accurate reconstruction of the thermal state, but also yields optimal locations of the sensors.

Some embodiments are based on another realization that when the placement of the sensors is also a part of the multivariable optimization, it is computationally efficient to execute the multivariable optimization via pairwise coupling, such that the observer is determined given the ODE and the set of locations of the sensors, the ODE is determined given the observer and the set of locations of the sensors, and the set of locations of the sensors is determined given the observer and the ODE. In such a manner, convergence of the multivariable optimization can be improved.

Further, according to some embodiments, a controller of the HVAC system can be modified with the optimized structure of the observer and the optimized structure of the ODE.

According to some embodiments, in the multivariable optimization, optimization of both the structure of the observer and the structure of the ODE is a primary optimization objective. In other words, the observer and the ODE are given equal/balanced importance in the multivariable optimization. However, some embodiments are based on recognition that the importance of the ODE and the observer in objectives of the online HVAC control are not equal. In an embodiment, the ODE is a primary objective, while the observer is a secondary objective because goal of the observer is to enable the ODE usage, i.e., the observer is subordinate to the ODE. To that end, a naïve joint consideration of the ODE and the observer may be suboptimal.

To mitigate such problem, the multivariable optimization is transformed to the multivariable constrained optimization. The multivariable constrained optimization provides interdependent but imbalanced multivariable optimization of the ODE and the observer, in which the ODE is a primary optimization objective and the observer is the secondary optimization objective. In other words, in the multivariable constrained optimization, the ODE is given higher importance compared to the observer. Therefore, unequal/imbalanced importance is given to the ODE and the observer. To achieve the interdependency, the system optimizes the structure of the observer and the structure of the ODE jointly, e.g., as part of a single unitary multivariable optimization. To achieve the imbalance importance, some embodiments use multivariable constrained optimization over the optimization of the ODE, in which the optimization of the structure of the observer acts as a constraint on the optimization of the ODE. In such a manner, the optimization of the structure of the observer becomes subordinate to the optimization of the ODE, because the structure of the observer does not have an independent optimization objective, and serves only to limit the structure of the ODE.

Additionally, some embodiments are based on a realization that when the multivariable optimization is transformed to the multivariable constrained optimization with imbalanced optimization objectives, the multivariable constrained optimization can be used to address some potential deficiencies of the structures of the ODE and the observer. For example, some techniques that determine the ODE and the observer sequentially, i.e., determine the ODE first and then determine the observer given the ODE, can make the matrix A of the ODE unstable. As used herein, stability is a characteristic that solutions that starts near an equilibrium point, remain close to the equilibrium point forever. To that end, even if the PDE is unstable, there is still a need to determine a stable ROM for control/observation purposes.

Some embodiments are based on the realization that because the multivariable optimization adds flexibility into the optimization of the structure of the ODE, it can be advantageous to perform the multivariable optimization subject to a stability constraint imposed on the structure of the ODE. Such an optimization may be referred to as a constrained optimization. According to an embodiment, the stability constraint may be a Lyapunov inequality.

Additionally or alternatively, some embodiments are based on the realization that the constraints imposed in the constrained optimization can include constraints on the structure of the observer without significantly increasing computational complexity of the multivariable optimization. Examples of such constraints include an observability constraint. As referred herein, the observability is a measure of how well internal states of a system, e.g. a temperature in the environment, can be inferred from knowledge of its external outputs, e.g. thermostats measurements. Hence, enforcing the observability on the structure of the observer can be advantageous because it ensures that with a given set of measurements, the temperature in the environment can be estimated. Examples of the observability constraint include Lyapunov equation for observability Gramian, having observability matrix as full rank, etc. Such a constrained optimization yields a stable and observable ROM.

However, some embodiments are based on the realization that transformation of the ODE optimization into the multivariable optimization, especially into the multivariable constrained optimization, creates an additional problem that does not exist in a regular single variable optimization of the structure of the ODE. For example, the aforementioned techniques that can solve the optimization of the structure of the ODE are either impossible or impractical for the multivariable constrained optimization. According to some embodiments, the multivariable constrained optimization can be solved using semi-definite programming (SDP). The SDP is a subfield of convex optimization concerned with the optimization of a linear objective function over an intersection of a cone of positive semidefinite matrices with an affine space. The system optimizes the cost function using the SDP that estimates the structure of the observer and the structure of the ODE in dependence on each other.

Further, some embodiments are based on the realization that while the SDP is a subfield of the convex optimization and the multivariable optimization of the structure of the observer and the ODE is a convex problem, the dimensionality of the ODE still presents a potentially impracticable computational burden on the SDP in the convex domain.

However, some embodiments are based on the realization that large-scale convex but constrained problems are more difficult to solve than large-scale nonconvex but unconstrained problems because as the SDP may not scale well for large dimensions of the matrix A (even though dimension of the matrix A is significantly lower than that of the CFD). To that end, some embodiments disclose an indirect SDP method that uses Cholesky factorization to convert the constrained convex multivariable optimization to an unconstrained non-convex multivariable optimization and solve the large-scale unconstrained nonconvex problems.

Accordingly, one embodiment discloses a system for controlling an operation of HVAC system arranged to condition an environment. The system comprises at least one processor; and memory having instructions stored thereon that, when executed by the at least one processor, cause the system to: receive data indicative of the operation of the HVAC system; optimize a cost function to reduce a difference between a full thermal state of the conditioned environment simulated from the received data based on a physical model of airflow including a partial differential equation (PDE) and a thermal state of the conditioned environment reconstructed by an observer using a reduced order model (ROM) of airflow including an ordinary differential equation (ODE) from values of the full thermal state at a set of locations, wherein optimization of the cost function is a multivariable optimization of a structure of the observer and a structure of the ODE; and modify a controller of the HVAC with the optimized structure of the observer and the optimized structure of the ODE.

Accordingly, another embodiment discloses a method for controlling an operation of HVAC system arranged to condition an environment. The method comprises receiving data indicative of the operation of the HVAC system; optimizing a cost function to reduce a difference between a full thermal state of the conditioned environment simulated from the received data based on a physical model of airflow including a partial differential equation (PDE) and a thermal state of the conditioned environment reconstructed by an observer using a reduced order model (ROM) of airflow including an ordinary differential equation (ODE) from values of the full thermal state at a set of locations, wherein optimization of the cost function is a multivariable optimization of a structure of the observer and a structure of the ODE; and modifying a controller of the HVAC with the optimized structure of the observer and the optimized structure of the ODE.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
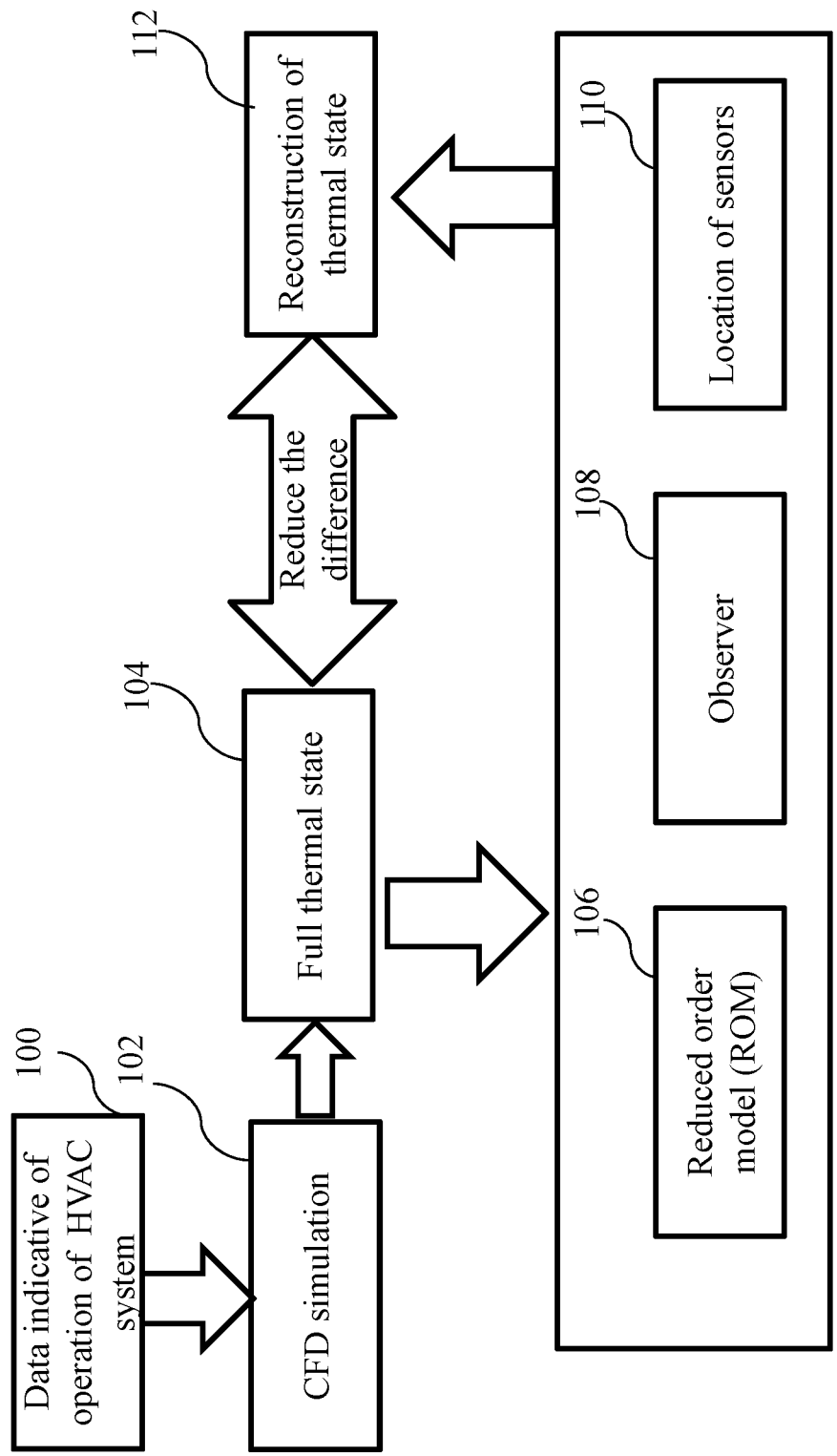
FIG. 1 shows a schematic of principles used by some embodiments for controlling an operation of heating, ventilating and air conditioning (HVAC) system arranged to condition an environment.

FIG. 1 shows a schematic of principles used by some embodiments for controlling an operation of heating, ventilating and air conditioning (HVAC) system arranged to condition an environment. The environment may be a room or space of a building, or the whole building where the HVAC system is installed. In some embodiments, the environment may correspond to space of the building where occupants are located or reside. In various implementations, the HVAC system may include multiple HVAC units installed to the environment. The HVAC system is configured to output air in the environment to condition the environment and ensure thermal comfort of the occupants of the environment. Thermal states of the outputted air include a temperature and a velocity of the air outputted by the HVAC system. In an alternate embodiment, the thermal state of the outputted air includes one or combination of the temperature, the velocity and humidity of the air outputted by the HVAC system.

According to an embodiment, a system for controlling the operation of the HVAC system is provided. The system may include a processor, and a memory configured to store instructions executable by the processor. The processor is configured to execute the instructions stored in the memory to perform steps required to control the operation of the HVAC system. The system may control the HVAC system to optimize energy consumption of the HVAC system by changing the thermal state in the environment. In an embodiment, the system is configured to receive data 100 indicative of the operation of the HVAC system. The data 100 indicative of the operation of the HVAC system may include boundary conditions corresponding to the environment. Additionally, the data 100 indicative of the operation of the HVAC system may include geometry of the environment, a number of inlets and outlets, and the like.

Since the HVAC control changes the thermal state in the environment to optimize the energy consumption, it is desirable to know dynamics of the airflow produced within the environment during the operation of the HVAC system. To that end, a physical model of the airflow is considered. For example, the physical model of the airflow can be defined according to a Boussinesq equation. However, computational cost for prediction and control of Boussinesq equations (comprising of Navier-Stokes equations along with conservation of energy), which serves as the physical model of the airflow, is intractable for real time control (or online control) of the HVAC system. For instance, the Boussinesq equation describing the physical model of the airflow is a partial differential equation (PDE) which is difficult to solve in the real time. Therefore, it is desired to represent the physical model of the airflow including the PDE with a reduced-order model (ROM) represented by an ordinary differential equation (ODE) having a number of parameters less than a number of parameters of the physical model of the airflow.

Some embodiments are based on understanding that many different techniques can perform such a dimensionality reduction. For example, based on the data 100 indicative of the operation of the HVAC system and the Boussinesq equation, the system executes computational fluid dynamic (CFD) simulation 102 to produce an estimation of the thermal state at all points (or locations) of the environment. In other words, the CFD simulation 102 technique can be used to simulate the dynamics of the airflow within the environment. The thermal state at all the points produced by the CFD simulation 102 is referred to as the full thermal state 104. The full thermal state 104 is contemplated as ground truth values of the thermal state at all the points of the environment. Further, the ROM 106 is derived such that estimation of the airflow dynamics within the environment using the ROM 106 approximates the full thermal state 104.

For example, the CFD simulation 102 yields the full thermal state 104 at each time instant. The full thermal state 104 at an instant of time is referred to as a snapshot. The different snapshots of the CFD simulation 102 can be organized into a matrix capturing the dynamics of the airflow, and the ROM 106 is determined by solving an optimization problem such that a difference between the dynamics of the airflow estimated by the ROM 106 in a low-dimensional space and the dynamics of the airflow provided by the CFD simulation 102 is minimized. Such an approach can be considered as a linear estimation of the ROM 106 as a matrix A by solving a minimization problem given by $\min \|AX_i - X_{i+1}\|$, wherein the matrix A is the ROM 106, $X_i$ represents the thermal state at time i. The matrix A can be used to estimate the airflow dynamics in the low-dimensional space in a linear fashion, e.g. $x_{i+1} = A^* x_i$. The minimization problem can be solved by several matrix decomposition techniques. For example, the matrix A can be determined using Proper Orthogonal Decomposing (POD) with Galerkin Projection, Dynamic Mode Decomposition (DMD), Spectral POD, Balanced POD, and the like. The aforementioned techniques can solve the minimization problem and determine the matrix A, i.e., the ROM 106.

In some cases, the determined ROM 106 may not be linear. The determined ROM 106 may be a quadratic or a nonlinear ROM. Further, the aforementioned techniques that can solve the minimization problem, alone or in combination, do not guarantee that the determined ROM 106 can be used for the online HVAC control, e.g. the determined ROM 106 may lack stability or observability. As the ROM 106 operates in the low-dimensional space, there is a need for an observer 108 that can use the airflow dynamics captured by the ROM 106 in the low-dimensional space and actual measurements at some points in the environment to produce an estimation/reconstruction 112 of a thermal state at all desired points in the environment. According to an embodiment, the observer 108 is a function of the ROM 106, i.e., the ODE and/or the matrix A, and placement of sensors in the environment. Specifically, a structure of the observer 108 includes a gain referred to herein as a gain matrix K, and designing the observer 108 means determining the matrix K.

Some embodiments are based on recognition that as the matrix K depends on the matrix A, the matrix A is determined at first, and then the matrix K is determined based on the matrix A. However, some embodiments are based on realization that calculation of the matrix K may influence the determination of the matrix A. In other words, there is interdependency between the determination of the matrix A and the matrix K. Consequently, some embodiments are based on realization that joint and interdependent optimization of the matrix A and the matrix K can improve accuracy and global optimality of the reconstruction 112 of the thermal state. To that end, the system performs a multivariable optimization that includes simultaneous optimization of a structure of the observer 108 (i.e., the matrix K) and a structure of the ROM 106 (i.e., the matrix A). In other words, the ROM 106 and the observer 108 are determined together as optimization parameters of a cost function using the full thermal state 104 as the ground truth.

Therefore, the system optimizes the cost function to reduce a difference between the full thermal state 104 of the environment simulated based on the received data 100 and the physical model of the airflow including the PDE and the thermal state 112 of the environment reconstructed by the observer 108 using the ROM 106 from values of the full thermal state at a set of locations. The optimization of the cost function is the multivariable optimization of the structure of the observer 108 and the structure of the ODE or the ROM 106. According to an embodiment, the set of locations of the sensors for measuring the thermal state is predetermined.

Additionally or alternatively, some embodiments are based on recognition that the matrix K is a function of the placement of the sensors in the environment. The sensors may measure one or combination of the temperature, the velocity, and the humidity of the air within the environment. The placement of the sensors can be represented as a binary matrix C with elements corresponding to locations in the environment. The elements of the matrix C have value 1 at the elements corresponding to the locations of the sensors, and values 0 otherwise. In some embodiments, the matrix C, i.e., the locations of the sensors 110, are predetermined by a designer of the HVAC system. However, in some other embodiments, the matrix C may be unknown and/or may be a design parameter. Some embodiments are based on realization that, as the matrix K depends on the matrix A and the matrix C, the matrix C can be incorporated as an optimization parameter in the multi-variable optimization. In other words, the structure of the ODE or the ROM 106, the structure of the observer 108, and the set of locations of the sensors 110 are jointly optimized as a part of the multivariable optimization, which is referred to as 'co-design'. The co-design approach not only yields accurate reconstruction 112 of the thermal state, but also yields optimal locations of the sensors 110.

Some embodiments are based on another realization that when the placement of the sensors is also a part of the multivariable optimization, it is computationally efficient to execute the multivariable optimization via pairwise coupling, such that the observer 108 is determined given the ODE and the set of locations of the sensors 110, the ODE is determined given the observer 108 and the set of locations of the sensors 110, and the set of locations of the sensors 110 is determined given the observer 108 and the ODE. In such a manner, convergence of the multivariable optimization can be improved.

Additionally or alternatively, in some embodiments, a set of locations of actuators of the HVAC system are known and represented by a matrix B. In such a case, the set of locations of the actuators are not considered in the multivariable optimization. However, when the locations of the actuators are unknown, the matrix B is incorporated as an optimization parameter in the multivariable optimization to determine the set of locations of the actuators of the HVAC system. To that end, in an embodiment, the multivariable optimization may correspond to joint optimization of the structure of the ODE or the ROM 106, the structure of the observer 108, the set of locations of the sensors 110, and the set of locations of the actuators.

Further, in some embodiments, a controller of the HVAC system can be modified with the optimized structure of the observer 108 and the optimized structure of the ODE. Specifically, the reconstructed thermal state 112 are used for the online HVAC control (e.g., a closed-loop control) to achieve a desired state (e.g., thermal comfort of occupants or minimal energy consumption of the HVAC system).

For example, the average temperature or velocity in the occupant region of the room, i.e., the part of the room in which occupants reside, can be considered as the desired state. For a certain condition of HVAC system, the resulting average temperature and velocity in the occupied region may be different than the desired state. Using the optimized structure of ODE, one is able to reconstruct the temperature and velocity in the occupant region and therefore can measure the difference between the current values and that of the desired ones. Then any feedback controller can be used to change the output of HVAC system, e.g., the velocity and temperature of HVAC which can be served as the controller, to be closer to the one perceived in the occupant region. Once the error (difference of desired and reconstructed) is evaluated the control (HVAC velocity, angle or temperature) can be tuned to make this error smaller. Even simple control strategies such as PID to extremum seeking can be used to systematically reduce such error.

Figure 2A:
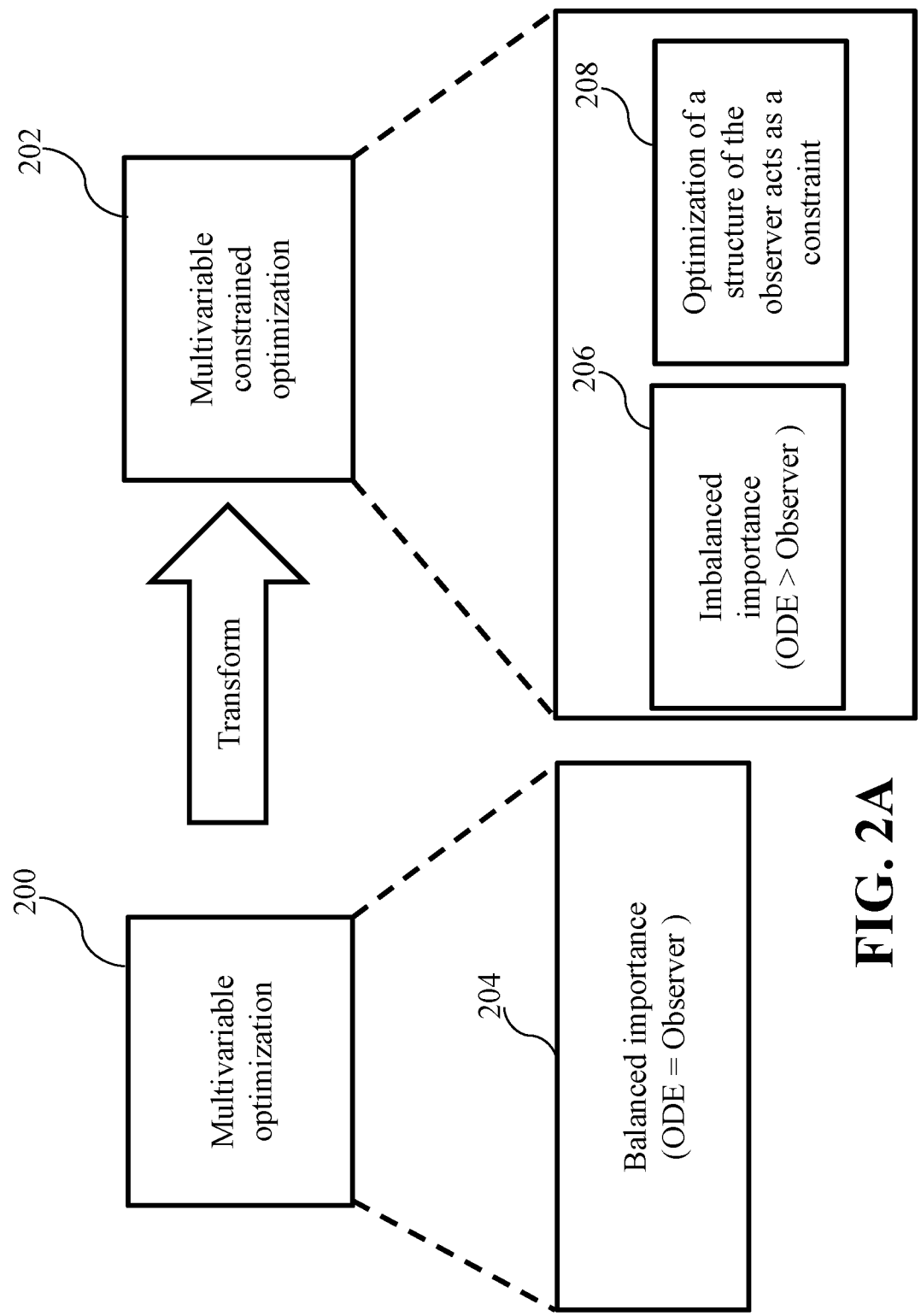
FIG. 2A shows a schematic of transformation of a multivariable optimization of a structure of an observer and a structure of an ordinary differential equation (ODE) to a multivariable constrained optimization, according to some embodiments.

FIG. 2A shows a schematic of transformation of the multivariable optimization 200 of the structure of the observer 108 and the structure of the ODE to a multivariable constrained optimization 202, according to some embodiments. In the multivariable optimization 200, optimization of both the structure of the observer 108 and the structure of the ODE is a primary optimization objective. In other words, the observer 108 and the ODE are given equal/balanced importance 204 in the multivariable optimization 200. However, some embodiments are based on recognition that the importance of the ODE and the observer 108 in objectives of the online HVAC control are not equal. In an embodiment, the ODE is a primary objective, while the observer 108 is a secondary objective because goal of the observer 108 is to enable the ODE usage, i.e., the observer 108 is subordinate to the ODE. To that end, a naïve joint consideration of the ODE and the observer 108 may be suboptimal.

To mitigate such problem, the multivariable optimization 200 is transformed to the multivariable constrained optimization 202. The multivariable constrained optimization 202 provides interdependent but imbalanced multivariable optimization of the ODE and the observer, in which the ODE is a primary optimization objective and the observer 108 is the secondary optimization objective. In other words, in the multivariable constrained optimization 202, the ODE is given higher importance compared to the observer 108. Therefore, unequal/imbalanced importance 206 is given to the ODE and the observer 108. To achieve the interdependency, the system optimizes the structure of the observer 108 and the structure of the ODE jointly, e.g., as part of a single unitary multivariable optimization. To achieve the imbalance importance 206, some embodiments use multivariable constrained optimization over the optimization of the ODE, in which the optimization of the structure of the observer 108 acts as a constraint 208 on the optimization of the ODE. In such a manner, the optimization of the structure of the observer 108 becomes subordinate to the optimization of the ODE, because the structure of the observer 108 does not have an independent optimization objective, and serves only to limit the structure of the ODE.

Additionally, some embodiments are based on a realization that when the multivariable optimization 200 is transformed to the multivariable constrained optimization 202 with imbalanced optimization objectives, the multivariable constrained optimization 202 can be used to address some potential deficiencies of the structures of the ODE and the observer 108. For example, some techniques that determine the ODE and the observer 108 sequentially, i.e., determine the ODE first and then determine the observer 108 given the ODE, can make the matrix A of the ODE unstable. As used herein, stability is a characteristic that solutions that starts near an equilibrium point, remain close to the equilibrium point forever. For example, a solution of the ODE stays close to a steady state solution at all times, if the HVAC system is perturbed slightly. Thus, performance of the HVAC system is dependent on the stability. To that end, even if the PDE is unstable, there is still a need to determine a stable ROM for control/observation purposes.

Figure 2B:
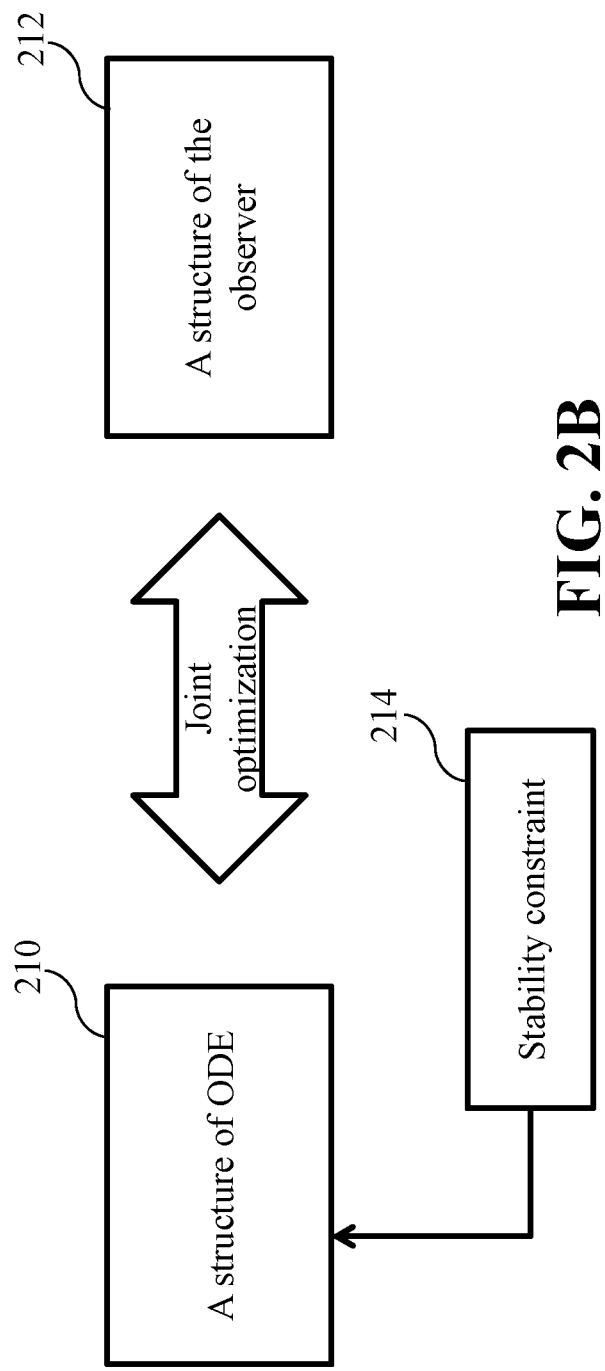
FIG. 2B shows a schematic of a constrained optimization for determining a stable reduced order model (ROM), according to some embodiments.

FIG. 2B shows a schematic of a constrained optimization for determining the stable ROM, according to some embodiments. Some embodiments are based on the realization that because the multivariable optimization adds flexibility into the optimization of the structure of the ODE 210, it can be advantageous to perform the multivariable optimization subject to a stability constraint 214 imposed on the structure of the ODE 210. Such an optimization may be referred to as a constrained optimization. Therefore, the constrained optimization may refer to joint optimization of the structure of the ODE 210 imposed with the stability constraint 214, and the structure of the observer 212. Such a constrained optimization yields the stable ROM. According to an embodiment, the stability constraint 214 may be a Lyapunov inequality.

Additionally or alternatively, some embodiments are based on the realization that the constraints imposed in the constrained optimization can include constraints on the structure of the observer 212 without significantly increasing computational complexity of the multivariable optimization. Examples of such constraints include an observability constraint. As referred herein, the observability is a measure of how well internal states of a system, e.g. a temperature in the environment, can be inferred from knowledge of its external outputs, e.g. thermostats measurements. Hence, enforcing the observability on the structure of the observer 108 can be advantageous because it ensures that with a given set of measurements, the temperature in the environment can be estimated.

Figure 2C:
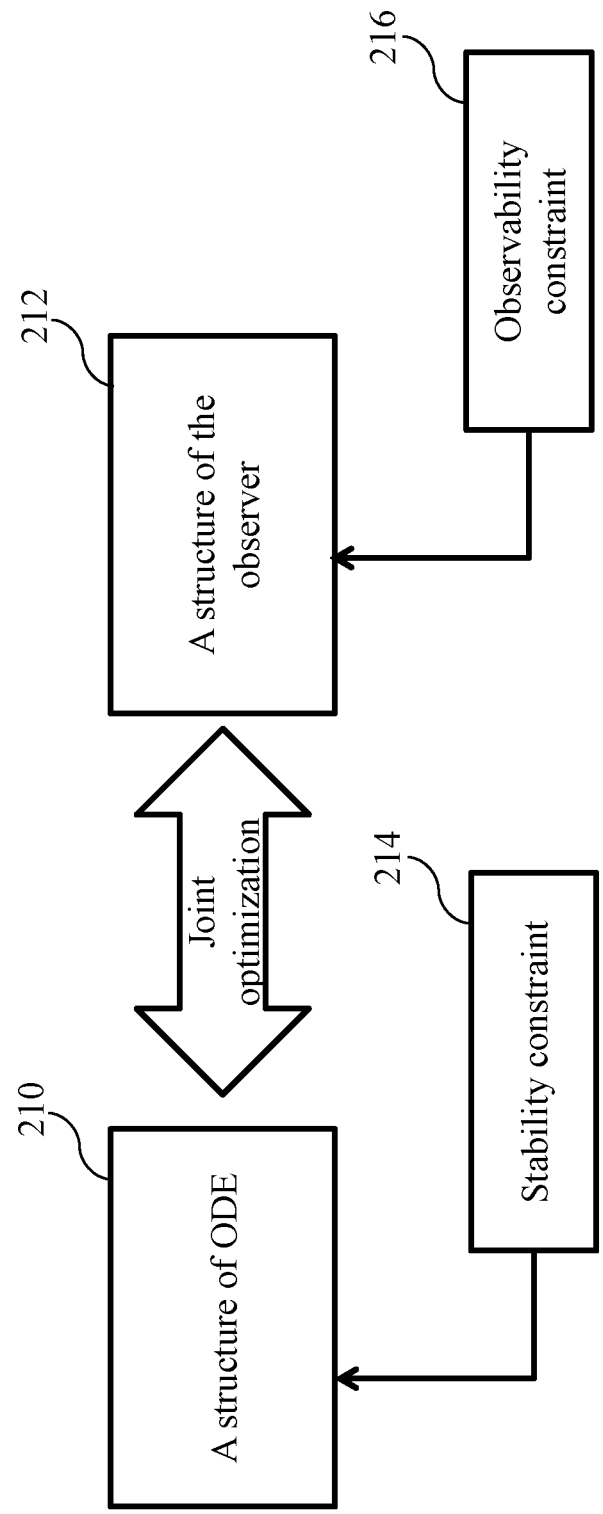
FIG. 2C shows a schematic of a constrained optimization imposed with a stability constraint and an observability constraint, according to some embodiments.

FIG. 2C shows a schematic of a constrained optimization imposed with the stability constraint 214 and an observability constraint 216, according to some embodiments. Here, the constrained optimization may correspond to joint optimization of the structure of the ODE 210 imposed with the stability constraint 214, and the structure of the observer 212 imposed with the observability constraint 216. Examples of the observability constraint 216 include Lyapunov equation for observability Gramian, having observability matrix as full rank, etc. Such a constrained optimization yields a stable and observable ROM.

However, some embodiments are based on the realization that transformation of the ODE optimization into the multivariable optimization, especially into the multivariable constrained optimization, creates an additional problem that does not exist in a regular single variable optimization of the structure of the ODE. For example, the aforementioned techniques that can solve the optimization of the structure of the ODE are either impossible or impractical for the multivariable constrained optimization and/or the constrained optimizations described above with reference to FIGS. 2A, 2B, and 2C.

According to some embodiments, the multivariable constrained optimization can be solved using semi-definite programming (SDP).

Figure 3:
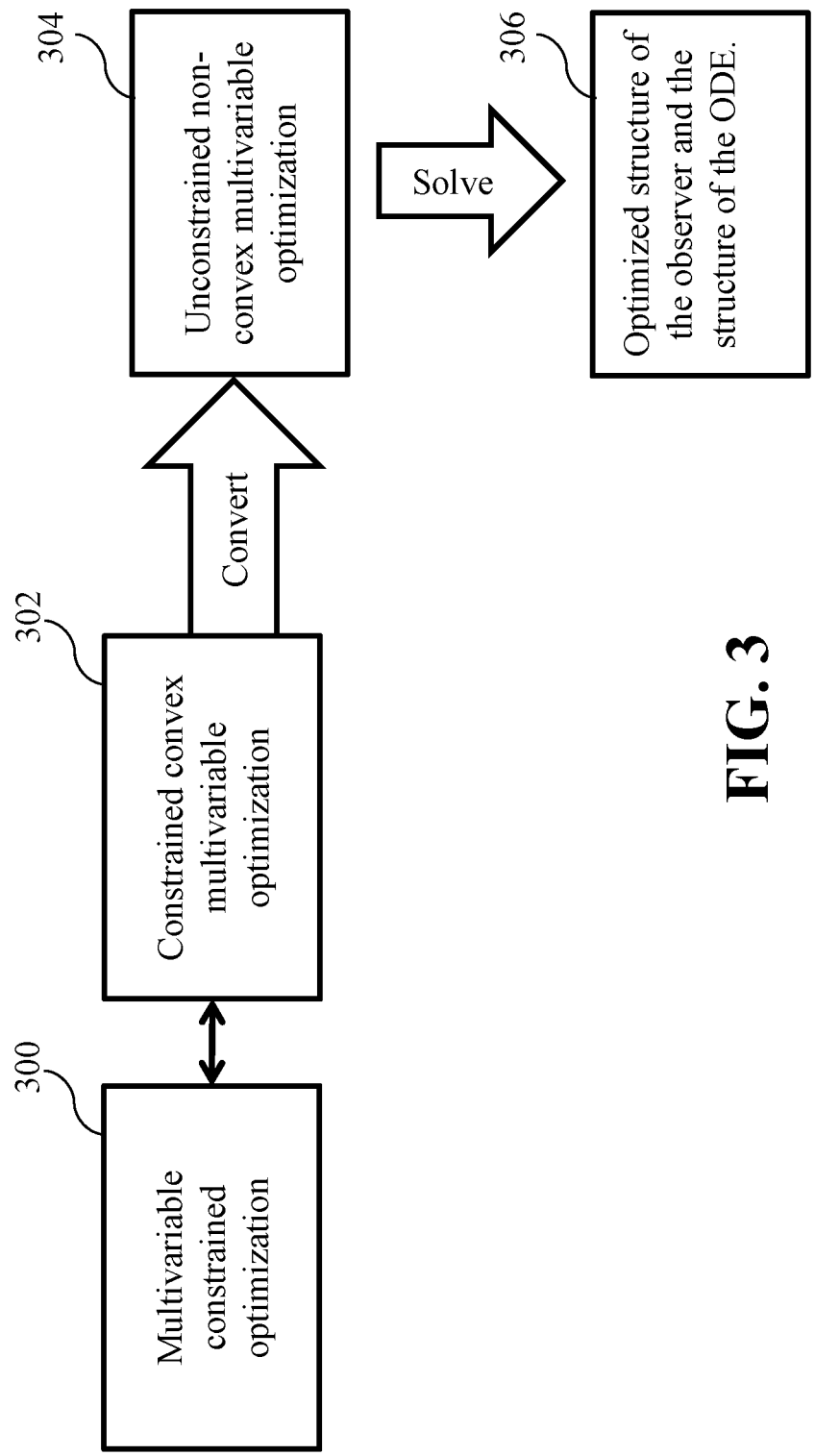
FIG. 3 shows a schematic for solving a multivariable constrained optimization based on semi-definite programming (SDP), according to some embodiments.

FIG. 3 shows a schematic for solving the multivariable constrained optimization 300 based on the SDP, according to some embodiments. The SDP is a subfield of convex optimization concerned with the optimization of a linear objective function over an intersection of a cone of positive semidefinite matrices with an affine space. The system optimizes the cost function using the SDP that estimates the structure of the observer and the structure of the ODE in dependence on each other. Some embodiments are based on recognition that the multivariable optimization of the structure of the observer and the ODE is a convex problem. As a result, the multivariable constrained optimization 300 is also a convex problem. Therefore, in some embodiments, the multivariable constrained optimization 300 may correspond to a constrained convex multivariable optimization 302.

Further, some embodiments are based on the realization that while the SDP is a subfield of the convex optimization and the multivariable optimization of the structure of the observer and the ODE is a convex problem, the dimensionality of the ODE still presents a potentially impracticable computational burden on the SDP in the convex domain. However, some embodiments are based on the realization that large-scale convex but constrained problems are more difficult to solve than large-scale nonconvex but unconstrained problems because as the SDP may not scale well for large dimensions of the matrix A (even though dimensions of the matrix A is significantly lower than that of the CFD). To that end, some embodiments are based on realization that it is beneficial to convert the constrained convex multivariable optimization 302 to an unconstrained non-convex multivariable optimization 304 which is easier to solve.

According to some embodiments, an indirect SDP method is used to convert the constrained convex multivariable optimization 302 to the unconstrained non-convex multivariable optimization 304. In particular, the indirect SDP method uses a Cholesky factorization to convert the constrained convex multivariable optimization 302 into the unconstrained non-convex multivariable optimization 304. The indirect SDP method is further used to solve the unconstrained non-convex multivariable optimization to optimize the structure of the observer 108 and the structure of the ODE. Consequently, an optimized structure of the observer 108 and an optimized structure of the ODE are produced 306.

System Overview

Figure 4:
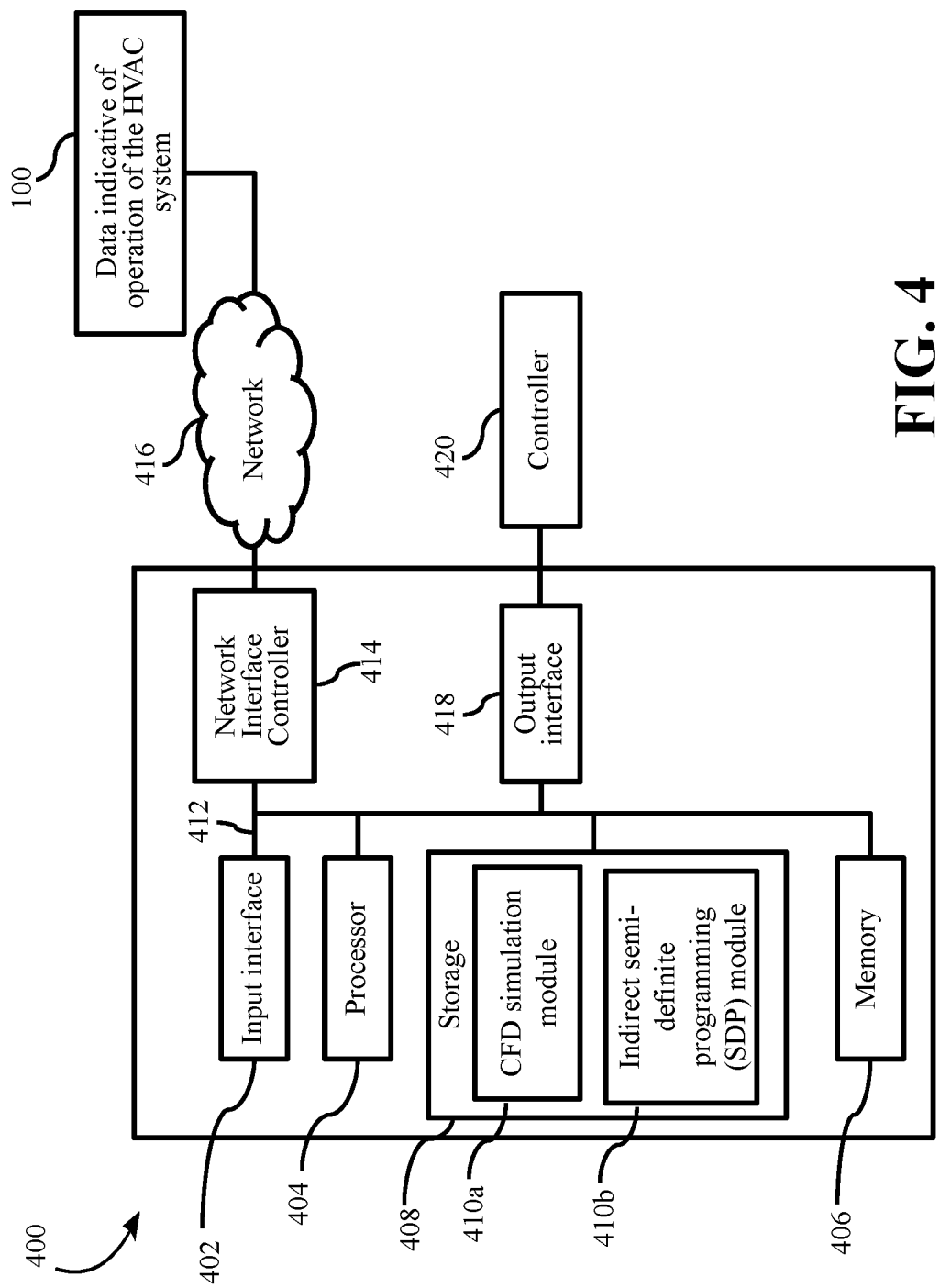
FIG. 4 shows a block diagram of a system for controlling the operation of the HVAC system arranged to condition the environment, according to some embodiments.

FIG. 4 shows a block diagram of the system for controlling the operation of the HVAC system arranged to condition an environment, according to some embodiments. The system 400 can have a number of interfaces connecting the system 400 with other systems and devices. For example, a network interface controller (NIC) 414 is adapted to connect the system 400, through a bus 412, to a network 416. Through the network 416, either wirelessly or through wires, the system 400 may receive the data 100 indicative of the operation of the HVAC system. Additionally or alternatively, the data 100 indicative of the operation of the HVAC system may be received via an input interface 402.

The system 400 includes a processor 404 configured to execute stored instructions, as well as a memory 406 that stores instructions that are executable by the processor 404. The processor 404 can be a single core processor, a multicore processor, a computing cluster, or any number of other configurations. The memory 406 can include random access memory (RAM), read only memory (ROM), flash memory, or any other suitable memory systems. The processor 404 is connected through the bus 412 to one or more input and output devices. Further, the system 400 includes a storage device 408 adapted to store different modules storing executable instructions for the processor 404. The storage device 408 can be implemented using a hard drive, an optical drive, a thumb drive, an array of drives, or any combinations thereof.

The storage device 408 is configured to store a CFD simulation module 410a for producing the full thermal state 104. In other words, the CFD simulation module 410a is used for simulating the airflow dynamics within the environment. The storage device 408 is configured to store an indirect SDP module 410b for solving the constrained convex multivariable optimization 302.

In some embodiments, the processor 404 is configured to optimize the cost function to reduce a difference between the full thermal state 104 of the conditioned environment simulated from the received data 100 based on the physical model of airflow including the PDE and the thermal state of the conditioned environment reconstructed 112 by the observer 108 using the ROM 106 of the airflow including an ordinary differential equation (ODE) from values of the full thermal state at a set of locations. The optimization of the cost function is the multivariable optimization of the structure of the observer 108 and the structure of the ODE. The set of locations for measuring the thermal state is predetermined and provided to the multi-variable optimization. The processor 404 is further configured to modify a controller 420 of the HVAC system with the optimized structure of the observer 108 and the optimized structure of the ODE. In some embodiments, the multivariable optimization is a constrained optimization of the structure of the ODE subject to a constraint imposed on the structure of the observer 108.

In some other embodiments, the constrained optimization is subject to a stability constraint imposed on the structure of the ODE.

Additionally, the system 400 may include an output interface 420. In some implementations, the system 400 is configured to submit, via the output interface 420, the optimized structure of the observer 108 and the optimized structure of the ODE to the controller 420.

CFD Solution

Figure 5:
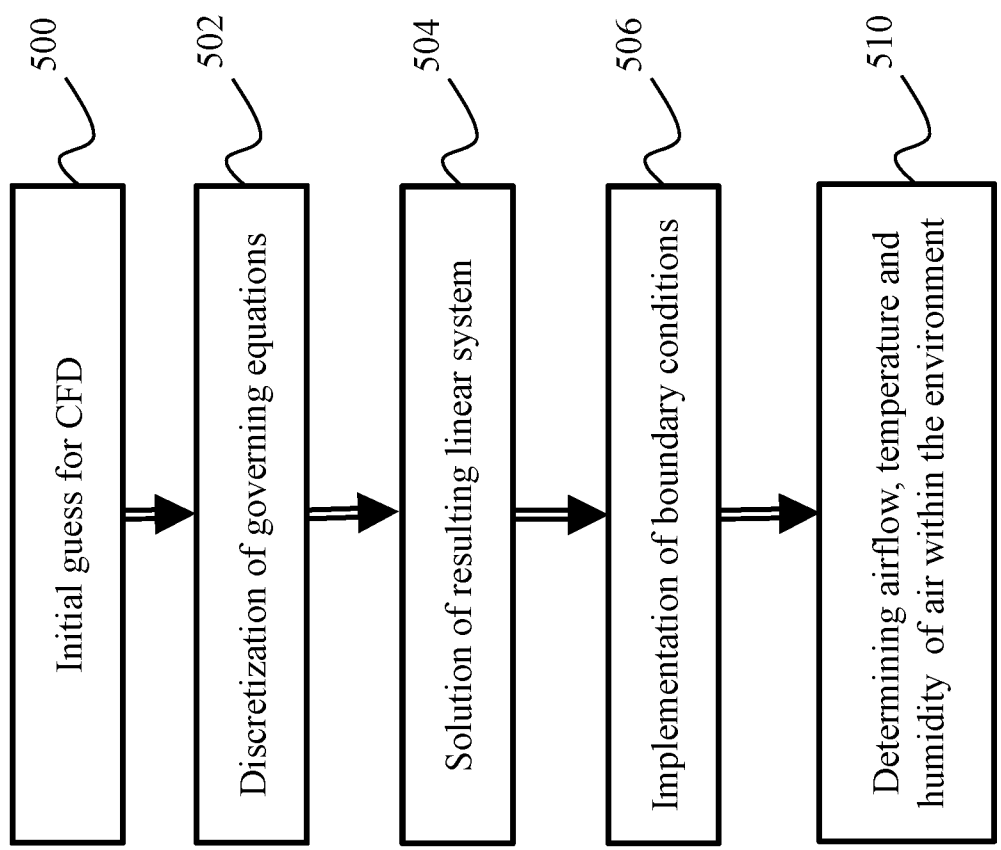
FIG. 5 illustrates a block diagram for a computational fluid dynamic (CFD) or partial differential equation (PDE) numerical solution, according to some embodiments.

FIG. 5 illustrates a block diagram for the CFD or PDE numerical solution, according to some embodiments. At block 500, an initial guess is provided for the CFD. The CFD solution is computed for the boundary conditions corresponding to the environment. For example, cold air of larger density enters the environment through a distributed inlet at top vent $\Gamma_i$, subject to Dirichlet boundary condition of prescribed inlet velocity and temperature and leaves the environment through an exhaust located at top left corner of domain $\Gamma_o$, subject to zero-Neumann boundary condition.

At block 502, the processor 404 executes the discretization of governing equations. In an embodiment, the governing equations are turbulent transient Boussinesq equations, which are incompressible Navier-Stokes equations coupled with heat transfer equations, and are given below, using Einstein notation $$0 = \frac{\partial u_j}{\partial x_j}, \quad (1)$$

$$0 = \frac{\partial u_i}{\partial \tau} + \frac{\partial u_i u_j}{\partial x_j} + \frac{\partial p_i}{\partial x_i} - Ri\delta_{i2}\theta - \frac{\partial}{\partial x_j}\left(\frac{1}{Re}\frac{\partial u_i}{\partial x_j}\right)$$

$$0 = \frac{\partial \theta}{\partial \tau} + \frac{\partial u_j \theta}{\partial x_j} - \frac{\partial}{\partial x_j}\left(\frac{1}{Pe}\frac{\partial \theta}{\partial x_j}\right),$$

with u, p, $\theta$ denoting scaled ensemble-averaged velocity, pressure, and temperature; $\delta_{ij}$ is a Kronecker delta. Non-dimensional numbers in Eq. 1 are given by $$Re = \frac{u_{in}L_{in}}{\nu_{eff}}, Pe = \frac{u_{in}L_{in}}{\kappa_{eff}}, Ri = \frac{u_{in}\theta_{in}L_{in}}{V_{in}^2},$$

where subscript "in" denotes values at the inlet, $\nu_{eff}$ and $\kappa_{eff}$ are effective viscosity and diffusivity, respectively, and are computed by unsteady Reynolds-averaged Navier Stokes (RANS) approach, in which there is a scale separation between unsteadiness of a mean flow and turbulence. For example, closure could be k-$\epsilon$ equations to model Reynolds stress and turbulent heat flux. Consequently, the closure is used to determine $\nu_{eff}$ and $\kappa_{eff}$. At block 504, the processor 404 determines a solution of resulting linear system.

During the computational fluid dynamics (CFD) simulation, the governing equations (e.g., Navier Stokes equations or energy equations) are first discretized. For example, in a finite-volume method, the domain (e.g., the room with furniture, appliances, and occupants) is partitioned into various small computational entity called finite volumes. The number of such finite volumes (cells) is a function of the geometry, velocity of HVAC, size of the room, desired accuracy, method to include various physics such as turbulence or radiation, etc. On each cell, the PDE can be written as a linear algebraic equation, whose solution is a function of neighboring cells. Hence, to find the thermal state (velocity, temperature, etc.), which are the solution of the PDE solved by CFD method, one has to solve the equations for all volumes. Since all equations after discretization are linear, a linear solver is being used at this stage show in block 504).

At block 506, the processor implements the boundary conditions. According to some embodiment, the boundary conditions are provided as follows:

$$\text{Inlet: } \Gamma_i = \begin{cases} u \cdot n = u_{in}, \\ u - u \cdot n = 0, \\ \theta = \theta_{in}, \\ n_j \frac{\partial p}{\partial x_j} = 0, \end{cases}$$

$$\text{Outlet: } \Gamma_o = \begin{cases} n_j \frac{\partial u_i}{\partial x_j} = 0, \\ n_j \frac{\partial \theta}{\partial x_j} = 0, \\ p = 0, \end{cases}$$

$$\text{Wall: } \bigcup_{k=1}^{4} \Gamma_{w,k} = \begin{cases} u = 0, \\ \theta = \theta_{wall}, \\ n_j \frac{\partial p}{\partial x_j} = 0, \end{cases}$$

where n is a unit vector normal to a surface.

Exterior serves as a heat load of the domain at boundaries $\Gamma_{w,1}$-$\Gamma_{w,4}$. In practice, wall temperature $T_{wall}$ is not known and is modeled as a disturbance input. Such disturbance input rarely conforms to standard stochastic distributions e.g., Gaussian, because it depends on ambient/exterior temperatures, wall material, amongst other factors, and therefore requires careful selection of robust estimators. Further, as a result of the implementation of the boundary conditions, at block 510, the airflow, the temperature and the humidity of the air within the environment is determined.

Mathematical Implementation of the Co-Design

Figure 6:
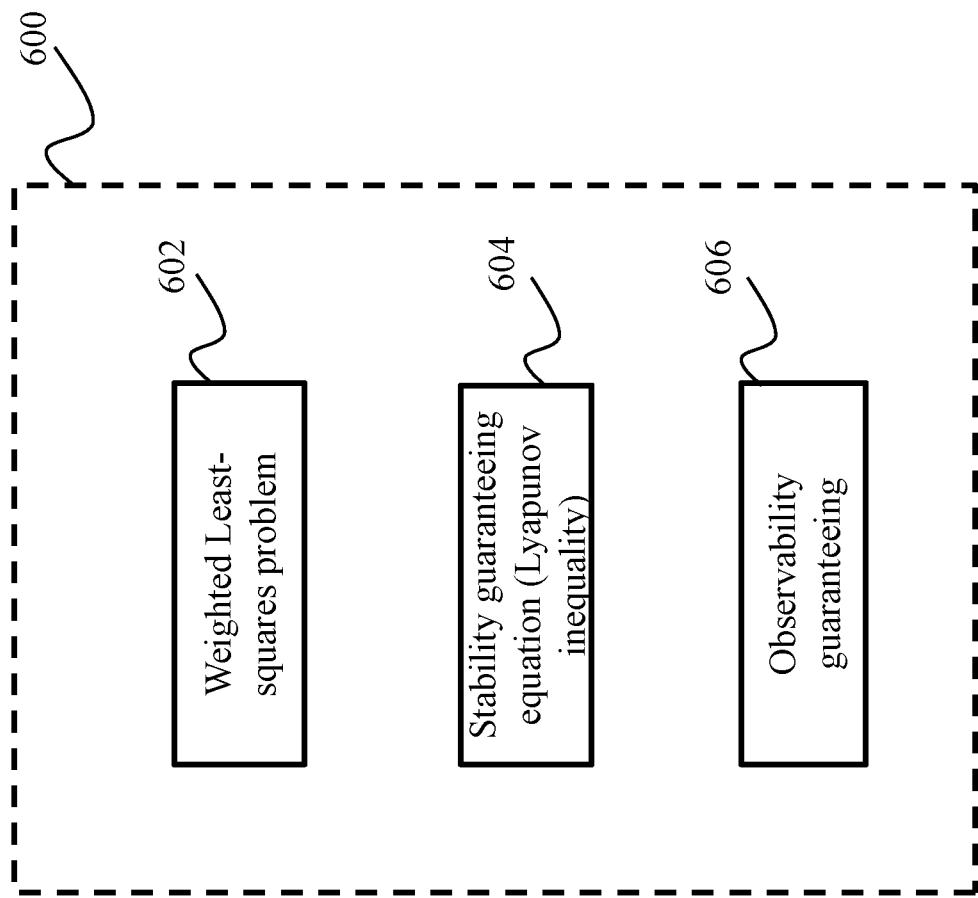
FIG. 6 shows a schematic of a co-design for determining a stable and observable ROM with location of sensors, according to some embodiments.

FIG. 6 shows a schematic of the co-design for determining a stable and observable ROM with the location of the sensors, according to some embodiments. A data-driven constrained optimization framework 600 is formulated for model reduction and stability of an identified model. The data-driven constrained optimization framework 600 includes a weighted least squares problem 602, a stability guaranteeing equation 604, and an observability guaranteeing 606 aspect.

At first, the weighted least squares problem 602 is considered. A, B, C, D are considered for identified system matrices with cost function:

$$J(A, B, C, D) = \left\| W_L \left( \begin{bmatrix} X_+ \\ Y \end{bmatrix} - \begin{bmatrix} A & B \\ C & D \end{bmatrix} \begin{bmatrix} X \\ U \end{bmatrix} \right) W_R \right\|_F,$$

where $\|\cdot\|_F$ denotes a Frobenius norm, Y is an output data matrix, $Y = [y_1, y_2, \ldots, y_m]$ and $W_L$ and $W_R$ are weighting matrices. In this formulation, A is the (reduced and linear) system (and it corresponds to the same notion of A used thorough this disclosure); B is the control matrix and may correspond to the location of actuator (HVAC system); C is also the measurement matrix and corresponds to the same notion of C used through this disclosure, i.e. the location of sensors; and D is a matrix used only when actuator can change measurements. In general, some embodiments accommodate such a matrix D, but in other embodiments, the matrix D is optional.

Optimal values of C, D which are denoted by C*, D*, respectively, can be obtained in a closed-form. However, a solution to the above weighted least squares problem will not yield a stable A.

To that end, the stability guaranteeing equation 604 needs to considered for determining the stable A. According to an embodiment, asymptotic stability of A is equivalent to requiring the following Lyapunov inequality with a positive definite matrix P:

$$P - APA^T \succeq \delta I_{n_x}.$$

It is an objective of some embodiments to use the Lyapunov inequality as a constraint in the weighted least-squares optimization problem. To achieve such an objective, some embodiments recognize, using Schur-complement lemma, that the Lyapunov inequality constraint can be equivalently expressed as:

$$\begin{bmatrix} P - \delta I_{n_x} & AP \\ PA^T & P \end{bmatrix} \succeq 0,$$

where $\delta > 0$, and it is introduced to facilitate computation. Further, weighting matrix R is expressed in following form:

$$W_R = \begin{bmatrix} X \\ U \end{bmatrix}^{\ddagger} \begin{bmatrix} PR_1 & 0 \\ 0 & R_2 \end{bmatrix}, W_L = \begin{bmatrix} L_1 & 0 \\ 0 & L_2 \end{bmatrix}$$

where, $R_1, L_1 \in \mathbb{R}^{n_x \times n_x}$ $R_2, L_2 \in \mathbb{R}^{n_u \times n_u}$, with regard to notation, $$V^{\ddagger} := V^T (VV^T)^{\dagger},$$

with $(\cdot)^{\dagger}$ denoting matrix pseudo-inverse. Further, $W_L$ and $W_R$ are substituted in the cost function and the cost function is given as:

$$\tilde{J}(A, B) = \left\| \begin{bmatrix} L_1 & 0 \\ 0 & L_2 \end{bmatrix} \left( X_+ \begin{bmatrix} X \\ U \end{bmatrix}^{\ddagger} \times \begin{bmatrix} PR_1 & 0 \\ 0 & R_2 \end{bmatrix} - [APR_1 \ BR_2] \right) \right\|_F.$$

According to some embodiments, the cost function can be expressed as:

$$\tilde{J}^2(A, B) = \tilde{J}_1^2(A) + \tilde{J}_2^2(B),$$

where $$\tilde{J}_1(A) := \|L_1(X_1 - A)PR_1\|_F,$$

$$\tilde{J}_2(B) := \|L_2(X_2 - B)R_2\|_F,$$

$$[X_1 \ X_2] := X_+ \begin{bmatrix} X \\ U \end{bmatrix}^{\ddagger},$$

and $X_1 \in \mathbb{R}^{n \times n}$ and $X_2 \in \mathbb{R}^{n \times m}$. A minimizer for B is $B^* = X_2$.
Further, the following change of variables is defined $$Q := AP,$$

and the following semidefinite program (SDP) is considered:

$$\min_{P,Q} \|L_1(X_1 P - Q)R_1\|_F^2 \quad (2)$$

$$\text{s.t.} \begin{bmatrix} P - \delta I_{n_x} & Q \\ Q^T & P \end{bmatrix} \succeq 0.$$

With optimal values of P, Q denoted by P*, Q*, respectively, optimal value of A* follows to be $$A^* = Q^*(P^*)^{-1}.$$

Some embodiments are based on an objective of designing an asymptotically stable observer together with plant dynamics. Some embodiments are based on recognition that, for discrete time systems, the observer is said to be asymptotically stable if an observer error converges to zeros as $k \to 0$ $$e(k+1) = \tilde{x}(k) - x(k)$$

An observer gain that needs to be designed, for instance, is L. Error dynamics are then given by, $$e(k+1) = (A + LC)e(k)$$

Therefore, the observer is asymptotically stable when A+LC includes Eigen values within a unit circle.

To this end, derivation of system matrix is modified to incorporate the observer gain. For observability guaranteeing 606, the SDP given by equation (2) is reformulated as:

$$\min_{P,A,L} \|L_1(X_1 P - AP)R_1\|_F^2$$

$$\text{s.t.} \begin{bmatrix} P - \delta I_{n_x} & (A + LC)P \\ \star & P \end{bmatrix} \succeq 0.$$

Furthermore, pre- and post-multiplication of $$\begin{bmatrix} P^{-1} & 0 \\ 0 & P^{-1} \end{bmatrix}$$

results in the following, $$\min_{P,A,L} \|L_1(X_1 P - AP)R_1\|_F^2$$

$$\text{s.t.} \begin{bmatrix} P^1 - \delta I & P^{-1}A + P^{-1}LC \\ \star & P^{-1} \end{bmatrix} \succeq 0.$$

At this point, let $R_1 = L_1 = P^{-1}$, which does not alter the cost function. Additionally, a change of variables is defined as, $$\tilde{P} = P^{-1}$$

$$\tilde{A} = P^{-1}A$$

$$\tilde{L} = P^{-1}L$$

Consequently, such change of variables converts a bilinear matrix inequality to a linear matrix inequality. Specifically, the SDP is given as $$\min_{\tilde{P},\tilde{A},\tilde{L}} \left\| (\tilde{P}X_1 - \tilde{A}) \right\|_F^2 \quad (3)$$

$$\text{s.t.} \begin{bmatrix} \tilde{P} - \delta I_{n_x} & \tilde{A} + \tilde{L}C \\ \star & \tilde{P} \end{bmatrix} \succeq 0.$$

Further, it is an object of some embodiments to solve the equation (3). According to some embodiments, the SDP problem (3) can be directly-solved, for example, by using interior points (IP) method. While the SDP problem (3) is convex, it is impractical to solve SDPs with a large state dimension. For instance, an overall complexity in solving the SDP with n×n matrices can be as large as $$O\left(n^{6.5} \ln\frac{1}{\epsilon}\right).$$

To that end, some embodiments are based on objective of providing tractable reformulations of original SDP. According to an embodiment, such an objective can be achieved by using an indirect SDP method.

An objective of the indirect SDP is to perform a Cholesky factorization of the LMI, $X \succeq 0$ as $X=RR^T$ and completely eliminate the constraint. Such Cholesky factorization results in a non-convex program which is shown to have some convergence guarantees. A rank of the Cholesky factorization, i.e., a number of columns of R, is chosen minimally so as to enhance computational speed while maintaining equivalence with the SDP. However, it is desired that X to be full rank and thus, Burer-Monteiro approach cannot be applied directly. However, the Cholesky factorization can be used to convert the constrained convex problem to an unconstrained non-convex problem, so that advanced algorithms can be used to solve large-scale unconstrained non-convex problems.

In an embodiment, blocks of the positive definite matrix in the following manner:

$$\begin{bmatrix} \tilde{P} - \delta I_{n_x} & \tilde{A} + \tilde{L}C \\ \star & \tilde{P} \end{bmatrix} := \begin{bmatrix} V_1 & V_2 \\ V_2^T & V_3 \end{bmatrix} := V = UU^T$$

where Cholesky decomposition of the Hermitian positive-definite matrix, V, is given by $UU^T$. As a result, the LMI can be eliminated. Subsequently, an originating objective function is:

$$\min_{U, \tilde{L}} \left\| (V_1 X_1 - V_2 + \tilde{L}C) \right\|_F^2 =: f(U, \tilde{L}).$$

Figure 7:
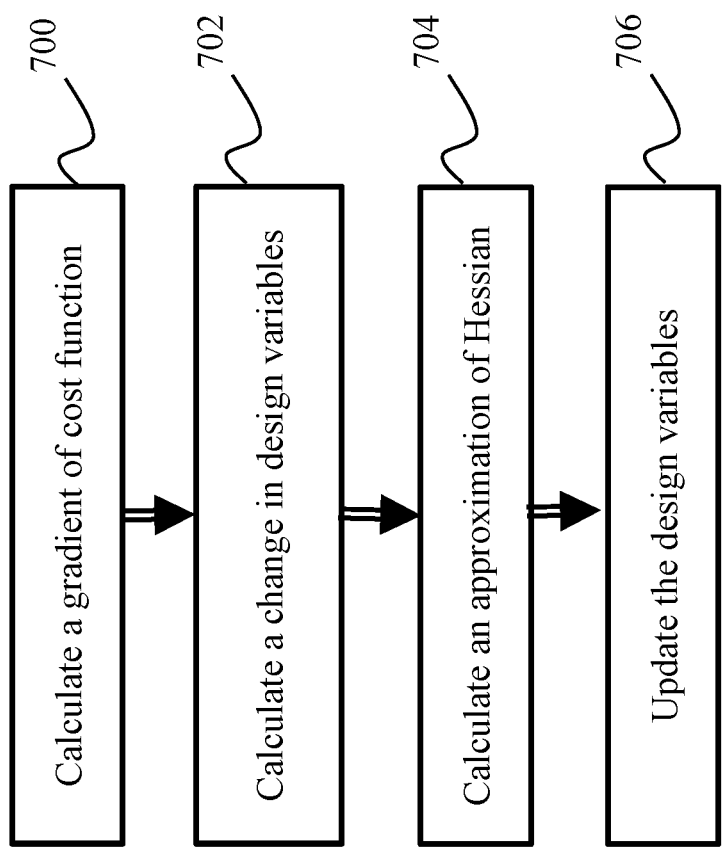
FIG. 7 shows a block diagram of Limited-memory BFGS (L-BFGS or LM-BFGS) approach, according to some embodiments.

Using an analytical gradient for optimization significantly simplifies computations. Gradients of f (U, $\tilde{L}$) with respect to U and $\tilde{L}$ are given as FIG. 7 shows a block diagram of Limited-memory BFGS (L-BFGS or LM-BFGS) approach, according to some embodiments. The limited-memory BFGS is an optimization algorithm in a family of quasi-Newton methods that approximates the Broyden-Fletcher-Goldfarb-Shanno algorithm (BFGS) using a limited amount of computer memory. The Limited-memory BFGS minimizes f (x) over unconstrained values of a real-vector x, where f is a differentiable scalar.

In some embodiments, like BFGS, the L-BFGS uses an estimate of an inverse Hessian matrix to search over a variable space. The BFGS stores a dense n×n approximation to the inverse Hessian matrix (n is a number of variables in optimization problem), whereas the Limited-memory stores only a few vectors that represent approximation implicitly. Due to resulting linear memory requirement of the Limited-memory, the Limited-memory is particularly used for optimization problems with a large number of variables. Instead of the inverse Hessian $H_K$, the Limited-memory maintains a history of past m updates of position x and gradient $\nabla f(x)$, where a history size may be small (m<10).

Therefore, in the Limited-memory BFGS approach, at block 700, the processor 404 calculates a gradient of the cost function. Further, at block 702, the processor 404 calculates a change in design variables (such A, C, K). At block 704, the processor 404 calculates an approximation of Hessian and, at block 706, the processor 404 updates the design variables.

Consider the optimization problem of FIG. 2 (join optimization or constrained optimization). Some embodiments then apply the Cholesky decomposition of the cost function. As a result, we can indeed eliminate the LMI. The originating objective function then is:

$$\min_{U, \tilde{L}} \left\| (V_1 X_1 - V_2 + \tilde{L}C) \right\|_F^2 =: f(U, \tilde{L}).$$

Here L is observer and U is related to the reduced order model A (and B). f(U,L) is a non-convex optimization which replaces the original convex problem. The advantage of such transformation is we now can find an analytical gradient for optimization, which in turn, greatly simplifies computations. The gradients of f (U, $\tilde{L}$) with respect to U and L are, respectively.

$$\nabla_U f = \begin{bmatrix} (V_1 X_1 - V_2 + LCV_1)(X_1 + LC)^T & -X_1 V_3 + V_2 - LCV_3 \\ \star & (V_3 X_1 - V_2 + LCV_3)(X_1 + LC)^T \end{bmatrix} U$$

$$\nabla_{\tilde{L}} f = (V_1 X_1 - V_2 + LCV_1)(CV_1)^T.$$

$$\nabla_U f = \begin{bmatrix} (V_1 X_1 - V_2 + LCV_1)(X_1 + LC)^T & -X_1 V_3 + V_2 - LCV_3 \\ \star & (V_3 X_1 - V_2 + LCV_3)(X_1 + LC)^T \end{bmatrix} U$$

$$\nabla_L f = (V_1 X_1 - V_2 + LCV_1)(CV_1)^T.$$

With transforming the problem into non-convex with analytical expression for gradient we need to choose a method to apply gradient descent. We use a class of quasi-Newton method which are faster in convergence.

Limited-memory BFGS (L-BFGS or LM-BFGS) is an optimization algorithm in the family of quasi-Newton methods that approximates the Broyden-Fletcher-Goldfarb-Shanno algorithm (BFGS) using a limited amount of computer memory. It is a popular algorithm for parameter estimation in machine learning. The algorithm's target problem is to minimize f (x) over unconstrained values of the real-vector x where f is a differentiable scalar.

Like BFGS, L-BFGS uses an estimate of the inverse Hessian matrix to search over the variable space. The difference lies in the fact that BFGS stores a dense n×n approximation to the inverse Hessian (n being the number of variables in the problem), L-BFGS stores only a few vectors that represent the approximation implicitly. Due to its resulting linear memory requirement, the L-BFGS method is particularly well suited for optimization problems with many variables. Instead of the inverse Hessian $H_K$, L-BFGS maintains a history of the past m updates of the position x and gradient $\nabla f(x)$, where the history size can be really small (m<10).

Algorithm: L-BFGS is very similar to quasi-newton methods in that the descent direction is chosen as $d_k = -H_k g_k$ where $H_k$ is Hessian inverse matrix and $g_k$ is the gradient at the $k^{th}$ step. Here, $d_k$ is known as the Newton's direction. In this, we compute the direction empirically using the "two loop recursions".

Suppose that $x_k$ is the argument of the optimization problem and $g_k = \nabla f(x_k)$, the gradient at the $k^{th}$ iteration. We also assume that we have stored last m updates of the form:

$s_k = x_{k+1} - x_k$ $g_k = g_{k+1} - g_k$.

We define $$\rho_k = \frac{1}{y_k^T s_k}.$$

To this end, the Hessian update is given by:

$H_{k+1} = (1 - \rho_k s_k y)k^T) H_k ((1 - \rho_k s_k y)k^T) + \rho_k s_k s_k^T$.

Figure 8:
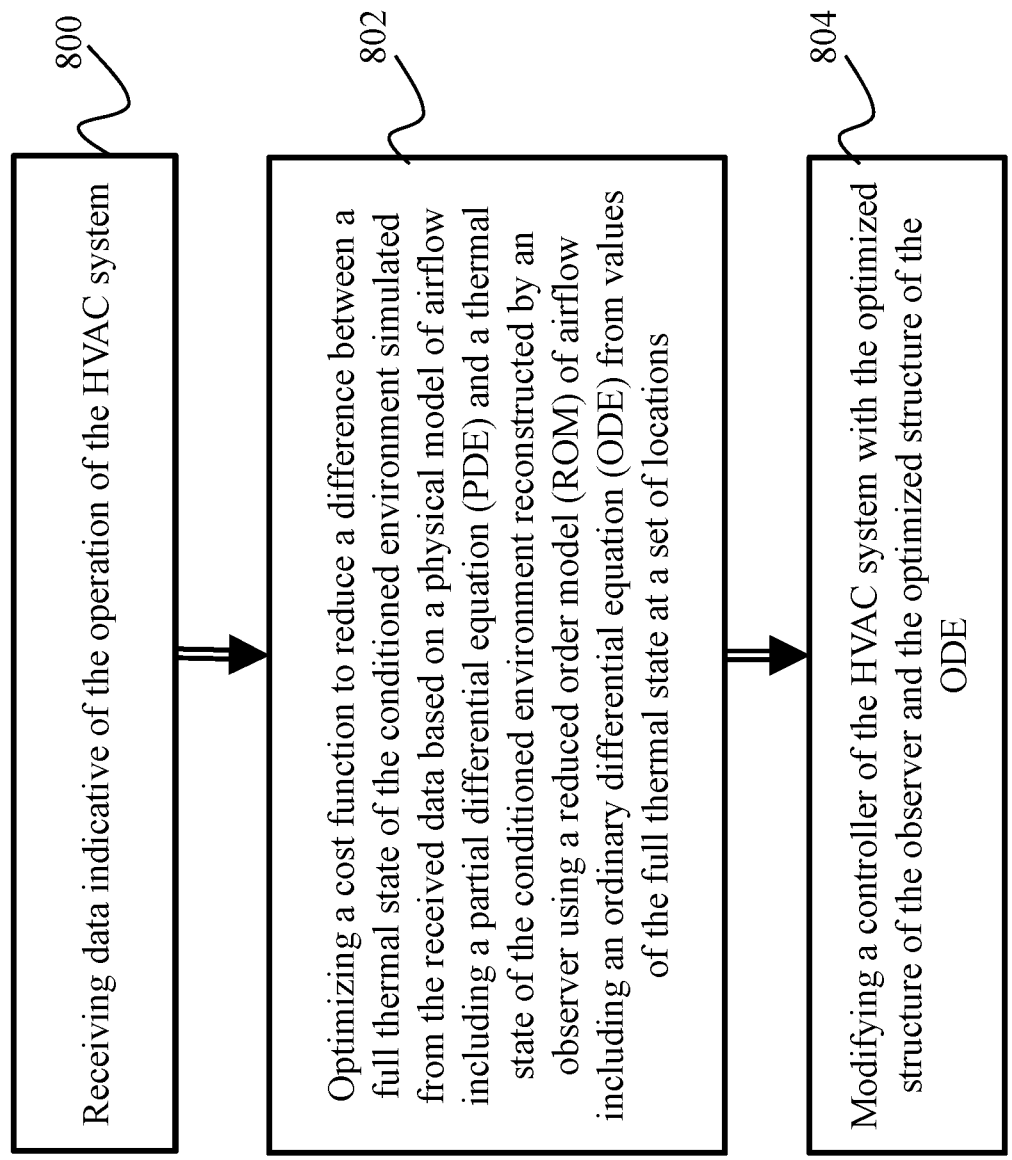
FIG. 8 shows a flowchart of a method for controlling the operation of HVAC system arranged to condition the environment, according to some embodiments.

FIG. 8 shows a flowchart of a method for controlling the operation of HVAC system arranged to condition the environment, according to some embodiments. At block 800, the method includes receiving data indicative of the operation of the HVAC system.

At block 802, the method includes optimizing a cost function to reduce a difference between a full thermal state (e.g., the full thermal state 104) of the conditioned environment simulated from the received data based on a physical model of airflow including a partial differential equation (PDE) and a thermal state of the conditioned environment reconstructed (e.g., reconstructed thermal state 112) by an observer (e.g., the observer 108) using a reduced order model (ROM) (e.g., ROM 106) of airflow including an ordinary differential equation (ODE) from values of the full thermal state at a set of locations. The optimization of the cost function is a multivariable optimization of a structure of the observer and a structure of the ODE. According to an embodiment, the set of locations for measuring the thermal state is predetermined and provided to the multi-variable optimization.

At block 804, the method includes modifying a controller of the HVAC system with the optimized structure of the observer and the optimized structure of the ODE.

Figure 9:
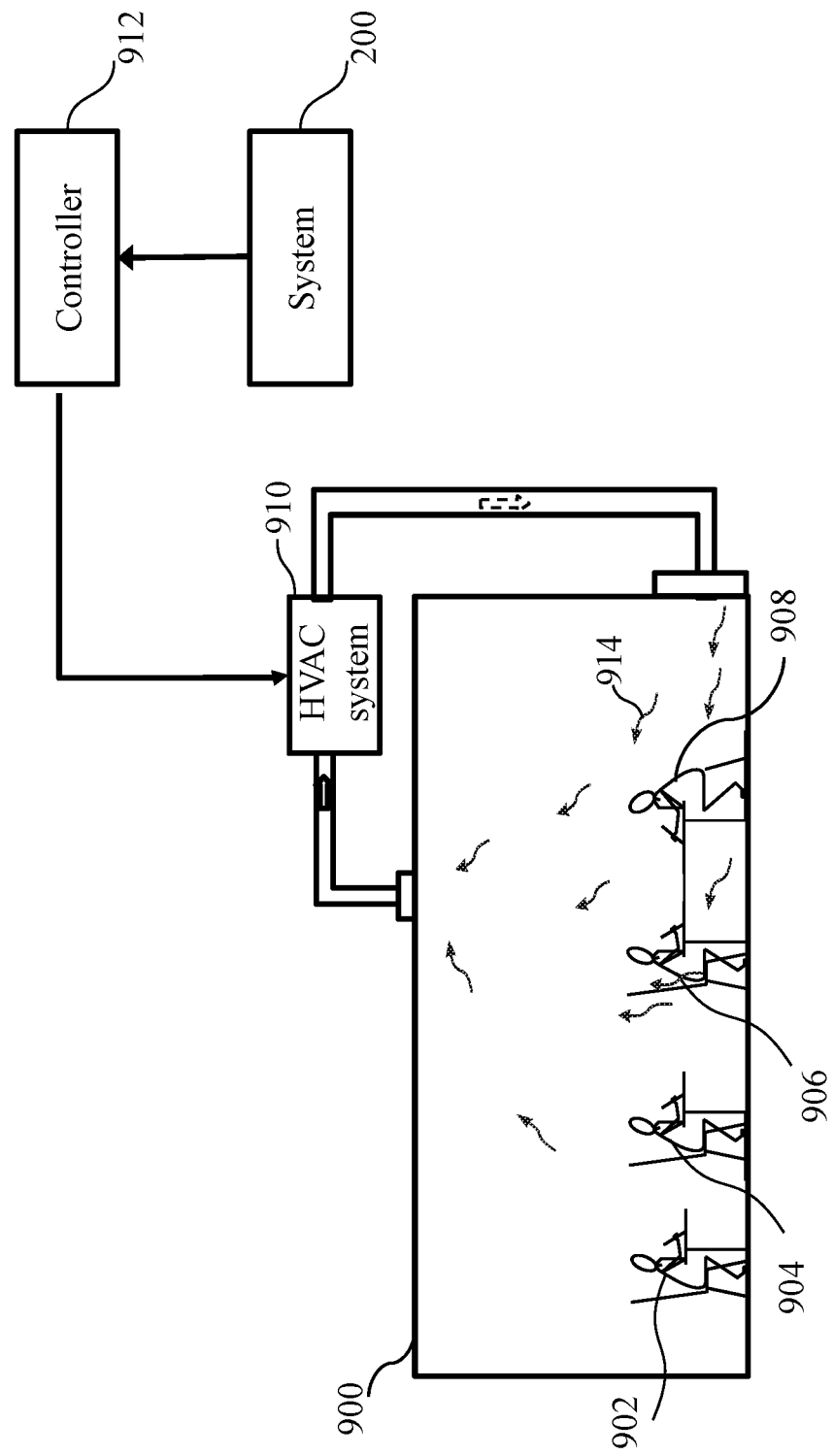
FIG. 9 illustrates controlling of the HVAC system using the system, according to some embodiments.

FIG. 9 illustrates controlling of heating, ventilating, and air-conditioning (HVAC system) 910 using the system 400, according to some embodiments. The HVAC system 910 is arranged to condition a room 900. The room 902 is occupied by occupants 902, 904, 906 and 908. Arrows 914 represent air supplied by the HVAC system 910 to condition the room 900. The system 200 may estimate thermal state at different locations in the room 900. Specifically, in some embodiments, the system 200 may estimate thermal state at locations of the occupants 902, 904, 906 and 908 in the room 900.

In an embodiment, a controller 912 associated with the HVAC system 910 may be provided with target thermal state at the locations of the occupants 902, 904, 906 and 908. For instance, a human operator may input the target thermal state at the locations of the occupants 902, 904, 906 and 908. Based on the thermal state at the locations of the occupants 902, 904, 906 and 908 estimated by the system 400, the controller 912 may generate control commands to achieve the target thermal state at the locations of the occupants 902, 904, 906 and 908. For instance, the control commands may include a speed of a compressor of the HVAC system 910, a speed of indoor fan of the HVAC system 910, a position of an expansion valve the HVAC system 910 and the like. The controller 912 further controls the HVAC system 910 according to the control commands to achieve the target thermal state at the locations of the occupants 902, 904, 906 and 908.

The above description provides exemplary embodiments only, and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A system for controlling an operation of heating, ventilating, and air-conditioning (HVAC) system arranged to condition an environment, comprising: at least one processor; and memory having instructions stored thereon that, when executed by the at least one processor, cause the system to:
receive data indicative of the operation of the HVAC system controlled by a controller of the HVAC system;
optimize a cost function to reduce a difference between a full thermal state of the conditioned environment simulated from the received data based on a physical model of airflow including a partial differential equation (PDE) and a thermal state of the conditioned environment reconstructed by an observer using a reduced order model (ROM) of airflow including an ordinary differential equation (ODE) from values of the full thermal state at a set of locations, wherein optimization of the cost function is a multivariable optimization that jointly and interdependently optimizes the set of locations for measuring the thermal state, a structure of the observer, and a structure of the ODE, wherein the multivariable optimization is a constrained optimization of the structure of the ODE subject to a constraint imposed on the structure of the observer, and wherein the constrained optimization is subject to a stability constraint imposed on the structure of the ODE and subject to an observability constraint imposed on the structure of the observer, wherein the processor optimizes the cost function using semi-definite programming (SDP) that estimates the structure of the observer and the structure of the ODE in dependence on each other; and
modify the controller of the HVAC system with the optimized structure of the observer and the optimized structure of the ODE causing the operation of the HVAC system controlled by the modified controller of the HVAC system based on the optimized set of locations for measuring the thermal state.

2. The system of claim 1, wherein the multivariable optimization is a constrained convex problem and the SDP uses an indirect solution that converts the constrained convex multivariable optimization into an unconstrained non-convex multivariable optimization and solves the unconstrained non-convex multivariable optimization to optimize the structure of the observer and the structure of the ODE.

3. The system of claim 2, wherein the indirect SDP converts the constrained convex multivariable optimization into the unconstrained non-convex multivariable optimization using a Cholesky factorization.

4. The system of claim 1, wherein in the cost function, the estimation of the observer, the ODE, and the set of locations is coupled.

5. A method for controlling an operation of heating, ventilating, and air-conditioning (HVAC) system arranged to condition an environment, comprising:
receiving data indicative of the operation of the HVAC system controlled by a controller of the HVAC system;
optimizing a cost function to reduce a difference between a full thermal state of the conditioned environment simulated from the received data based on a physical model of airflow including a partial differential equation (PDE) and a thermal state of the conditioned environment reconstructed by an observer using a reduced order model (ROM) of airflow including an ordinary differential equation (ODE) from values of the full thermal state at a set of locations, wherein optimization of the cost function is a multivariable optimization that jointly and interdependently optimizes the set of locations for measuring the thermal state, a structure of the observer and a structure of the ODE, wherein the multivariable optimization is a constrained optimization of the structure of the ODE subject to a constraint imposed on the structure of the observer, and wherein the constrained optimization is subject to a stability constraint imposed on the structure of the ODE and subject to an observability constraint imposed on the structure of the observer, wherein the cost function is optimized using semi-definite programming (SDP) that estimates the structure of the observer and the structure of the ODE in dependence on each other; and modifying a controller of the HVAC system with the optimized structure of the observer and the optimized structure of the ODE causing the operation of the HVAC system controlled by the modified controller of the HVAC system based on the optimized set of locations for measuring the thermal state.

6. The method of claim 5, wherein the multivariable optimization is a constrained convex problem and the SDP uses an indirect solution that converts the constrained convex multivariable optimization into an unconstrained non-convex multivariable optimization and solves the unconstrained non-convex multivariable optimization to optimize the structure of the observer and the structure of the ODE.

7. The method of claim 6, wherein the indirect SDP converts the constrained convex multivariable optimization into the unconstrained non-convex multivariable optimization using a low-rank approximation.

8. The method of claim 7, wherein the low-rank approximation includes a Cholesky factorization.

* * * * *